United States Patent
McGreevy et al.

(10) Patent No.: US 8,512,050 B2
(45) Date of Patent: Aug. 20, 2013

(54) SOLAR PANEL JUNCTION BOX

(75) Inventors: Sean McGreevy, Newport (IE);
Maurice Shanahan, Westbury (IE);
Peter Commane, Shannon (IE); Mike O'Mahony, County Limerick (IE);
Eugene Folan, Ennis (IE)

(73) Assignee: Molex Incorporated, Lisle, IL (US)

( * ) Notice: Subject to any disclaimer, the term of this patent is extended or adjusted under 35 U.S.C. 154(b) by 53 days.

(21) Appl. No.: 12/988,411

(22) PCT Filed: Apr. 16, 2009

(86) PCT No.: PCT/US2009/040843
§ 371 (c)(1),
(2), (4) Date: Dec. 13, 2010

(87) PCT Pub. No.: WO2009/129405
PCT Pub. Date: Oct. 22, 2009

(65) Prior Publication Data
US 2011/0168228 A1     Jul. 14, 2011

Related U.S. Application Data

(63) Continuation-in-part of application No. 12/148,088, filed on Apr. 16, 2008, now Pat. No. 7,833,033.

(60) Provisional application No. 61/154,289, filed on Feb. 20, 2009.

(51) Int. Cl.
*H01R 25/00*     (2006.01)

(52) U.S. Cl.
USPC ........................................ 439/76.1

(58) Field of Classification Search
USPC ................ 439/212, 213, 110, 535, 76.1, 871; 174/244
See application file for complete search history.

(56) References Cited

U.S. PATENT DOCUMENTS

| | | | |
|---|---|---|---|
| 2,408,843 | A | 10/1946 | Gauthier |
| 2,762,030 | A | 9/1956 | Scoville |

(Continued)

FOREIGN PATENT DOCUMENTS

| | | |
|---|---|---|
| DE | 10-2006-012665 | 10/2006 |
| EP | 0 999 601 A1 | 5/2000 |
| EP | 1 601 024 A2 | 11/2005 |
| EP | 1 729 369 A2 | 12/2006 |

OTHER PUBLICATIONS

International Search Report for PCT/US2009/040843.

*Primary Examiner* — Alexander Gilman
(74) *Attorney, Agent, or Firm* — Larry I. Golden

(57) ABSTRACT

A junction box is disclosed for a solar panel. The junction box can have a base portion and cover portion nesting together. The base portion can have an extending skirt portion and be secured to the solar panel and have one or more contacts for making electrical contact with the solar panel. All other electrical components of the junction box can reside in the top portion for ease of accessibility in making cable or wire connections and/or maintaining the electrical components therein. The cover portion can have one or more terminals for connecting to the one or more contacts of the bottom portion when the cover and base portion are brought together. The terminals can be configured and mounted to the cover to provide connection with cables, to be electrically connected to each other with electrical components, and to dissipate heat produced by the electrical components.

12 Claims, 14 Drawing Sheets

(56) References Cited

U.S. PATENT DOCUMENTS

| | | | |
|---|---|---|---|
| 3,657,683 A | 4/1972 | Grieshaber | |
| 4,157,207 A | 6/1979 | Robinson | |
| 4,423,920 A | 1/1984 | Cooper et al. | |
| 5,314,350 A | 5/1994 | Matthews et al. | |
| 5,554,040 A | 9/1996 | Sugiura et al. | |
| 6,093,757 A * | 7/2000 | Pern | 524/99 |
| 6,344,612 B1 * | 2/2002 | Kuwahara et al. | 174/50 |
| 6,461,172 B2 | 10/2002 | Ross | |
| 6,494,723 B2 | 12/2002 | Yamane et al. | |
| 6,655,987 B2 * | 12/2003 | Higashikozono et al. | 439/535 |
| 7,134,883 B2 * | 11/2006 | Werner et al. | 439/76.1 |
| 7,530,837 B2 * | 5/2009 | Nieleck et al. | 439/441 |
| 7,531,740 B2 * | 5/2009 | Flaherty et al. | 136/244 |
| 7,833,033 B2 * | 11/2010 | McMahon et al. | 439/212 |
| 8,075,326 B2 * | 12/2011 | Quiter et al. | 439/224 |
| 8,113,853 B2 * | 2/2012 | Coyle et al. | 439/76.1 |
| 8,137,115 B1 * | 3/2012 | Chou et al. | 439/76.1 |
| 2010/0218802 A1 * | 9/2010 | Quiter | 136/244 |
| 2011/0108085 A1 * | 5/2011 | Quiter | 136/244 |
| 2011/0195585 A1 * | 8/2011 | Feldmeier et al. | 439/110 |

\* cited by examiner

SOLAR PANEL JUNCTION BOX

This application is a continuation-in-part of U.S. patent application Ser. No. 12/148,088 filed on Apr. 16, 2008 which is incorporated herein by reference, and also claims the benefit of U.S. Provisional Patent Application Ser. No. 61/154,289 filed on Feb. 20, 2009, which is incorporated herein by reference.

BACKGROUND

The present disclosure is directed generally to connectors for providing an electrical connection from foil or flat conductors to plug connectors able to receive cables or wires. In particular, the present disclosure is directed to a junction box for quick and efficient electrical connection to the foil or flat conductors of solar cells.

Solar cells convert light energy to electrical energy. Typically one or more solar cells are sandwiched between glass sheets or glass and laminate substrate to form a solar panel. Thin flat metal conductors or foil conductors emanating from the solar cells transport the generated electrical energy. The glass or laminate is provided with an access area or hole to allow the foil conductors to be connected to a junction box or other electrical connector. The junction box usually has contacts for providing electrical connection between the foil conductors and plug connectors which can receive wires or cable to permit connection to the solar cells. The plug connectors can permit quick, easy and efficient connection to other solar panels, batteries, inverters or power supply utilities.

Foil conductors are typically connected to the junction box by manual processes. Installation of junction boxes to solar panels via automation is inhibited by the varying configurations of solar panel design and in particular the manner in which access is provided to the foil conductors of the solar panel. In addition to this shortcoming, servicing junction boxes which contain electrical components such as diodes and terminals can be difficult since junction boxes are typically located in hard to access areas of the solar panels which are also typically located in hard to access areas, e.g. roofs. Also, current junction boxes may not be able to accommodate increases in electrical current as the efficiency of energy conversion of solar panels increases.

Junction boxes according to the present disclosure can permit automated mounting to a solar panel and connection to the foil conductors thereof. Junction boxes disclosed herein may also facilitate servicing and/or replacement of electrical components housed therein. Also in keeping with the present disclosure, junction boxes may accommodate higher currents for use with solar panels having increased efficiency.

SUMMARY

In one aspect of the present disclosure, a solar panel junction box is provided comprising a base module and a cover module. The base module has a generally flat bottom wall with an outer bottom surface and an inner top surface. The bottom wall includes a cut-out portion and a plurality of terminals mounted to the inner top surface of the bottom wall. Each terminal has one end with a solder terminal extending over the cut-out portion and an opposite end has clip terminals extending upward from the inner top surface. The base portion includes an upstanding base peripheral wall adapted to nestingly mate with an upstanding cover peripheral wall. The cover module includes a generally flat top wall with an outer top surface and an inner bottom surface. The cover module includes an upstanding cover peripheral wall adapted to nestingly mate with the upstanding base peripheral wall and a plurality of main component terminals secured, in parallel orientation to each other, to the inner bottom surface. The plurality of main component terminals includes a pair of outer main component terminals and a pair of inner main component terminals. Each of the main component terminals has a generally rectangular configuration with a first end and a second end and an intermediate portion. Each intermediate portion comprises a generally flat rectangular terminal secured to the inner bottom surface and has a connection tab extending perpendicular from the inner bottom surface for connection to a respective one of the clip terminals. The first end of each outer main component terminal and the first end of each inner main component terminal includes a raised tail portion providing a plurality of axially aligned contact retaining channels. The pair of inner main component terminals each has an opposite raised tail portion at its second end providing a pair of axially aligned contact retaining channels. A first diode connected between the axially aligned contact retaining channels of the first end of one of the outer main component terminals and the first end of the inner terminal adjacent thereto. A second diode is connected between the axially aligned contact retaining channels of the first end of the other outer main component terminal and the first end of the inner terminal adjacent thereto. A third diode is connected between the axially aligned contact retaining channels of the second end of the inner main component terminals. The second end of each outer main component terminal includes an upstanding cable connection terminal. The upstanding cover peripheral wall includes a pair of cable access openings positioned adjacent the respective cable connection terminals to facilitate electrical cable connection to the cable connection terminals.

In another aspect of the present disclosure, a solar panel junction box is provided comprising a base module and a cover module. The base module has a generally flat bottom wall with an outer bottom surface and an inner top surface. The bottom wall includes a cut-out portion and a plurality of terminals mounted to the inner top surface of the bottom wall. Each terminal has one end with a solder terminal extending over the cut-out portion and an opposite end has clip terminals extending upward from the inner top surface. The base module includes an upstanding base peripheral wall adapted to nestingly mate with an upstanding cover peripheral wall. The base module has a flanged skirt portion extending circumferentially outward from the upstanding peripheral wall in generally coplanar relationship to the bottom wall a distance at least as great as the height of the peripheral wall. The cover module includes a generally flat top wall with an outer top surface and an inner bottom surface. The cover module includes an upstanding cover peripheral wall adapted to nestingly mate with the upstanding base peripheral wall and a plurality of main component terminals secured to said inner bottom surface. The plurality of main component terminals includes a pair of outer main component terminals and a pair of inner main component terminals. Each of the main component terminals has a connection tab extending perpendicular from the inner bottom surface for connection to a respective one of the clip terminals. A plurality of diodes serially connects the main component terminals within the cover module. Each outer main component terminal includes an upstanding cable connection terminal. The upstanding cover peripheral wall includes a pair of cable access openings positioned adjacent the respective cable connection terminals to facilitate electrical cable connection to the cable connection terminals.

Other aspects, objects and advantages of the present disclosure will be understood from the following description according to the illustrated embodiments of the present disclosure, specifically including stated and unstated combinations of the various features which are described herein and relevant information which is shown in the accompanying drawings and examples.

BRIEF DESCRIPTION OF THE DRAWINGS

In the following detailed description, reference will frequently be made to the following views of the drawing, in which like reference numerals refer to like components, and in which.

DETAILED DESCRIPTION

It is to be understood that the disclosed embodiments are merely exemplary of the disclosure, which may be embodied in various forms. Therefore, specific details disclosed herein are not to be interpreted as limiting, but merely as a representative basis for teaching one skilled in the art to variously employ the inventive features herein disclosed in virtually any appropriate manner and combination.

Figure 1:
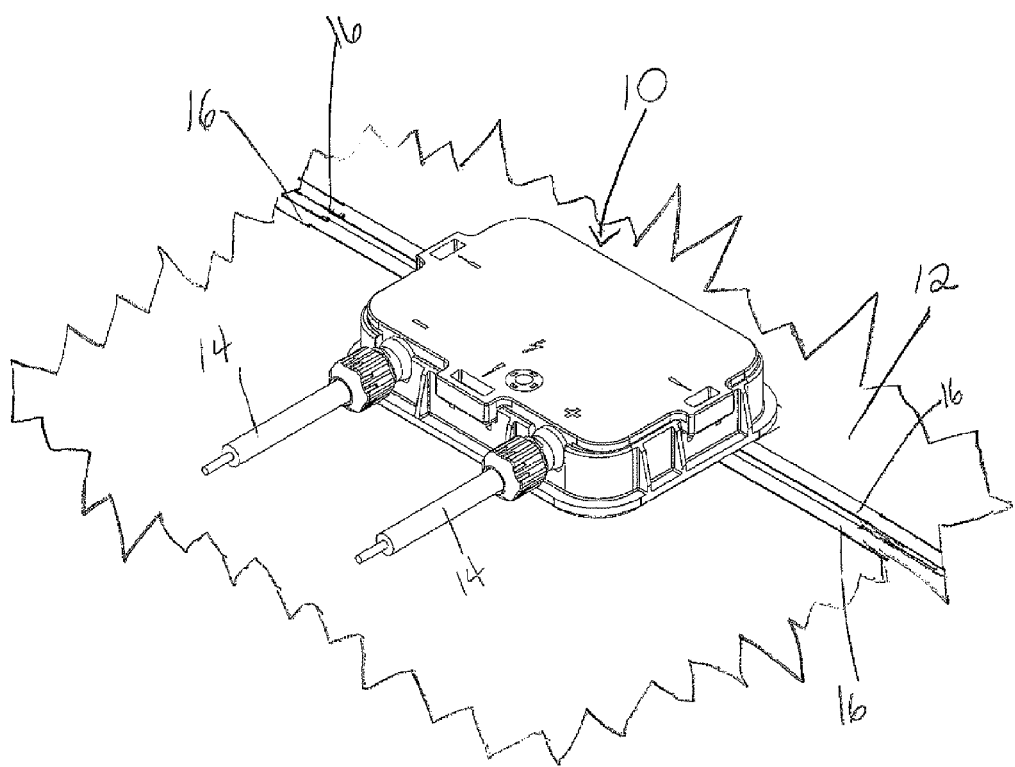
FIG. 1 is a perspective view of one embodiment of a junction box according to the present disclosure secured to a solar panel.
Figure 2:
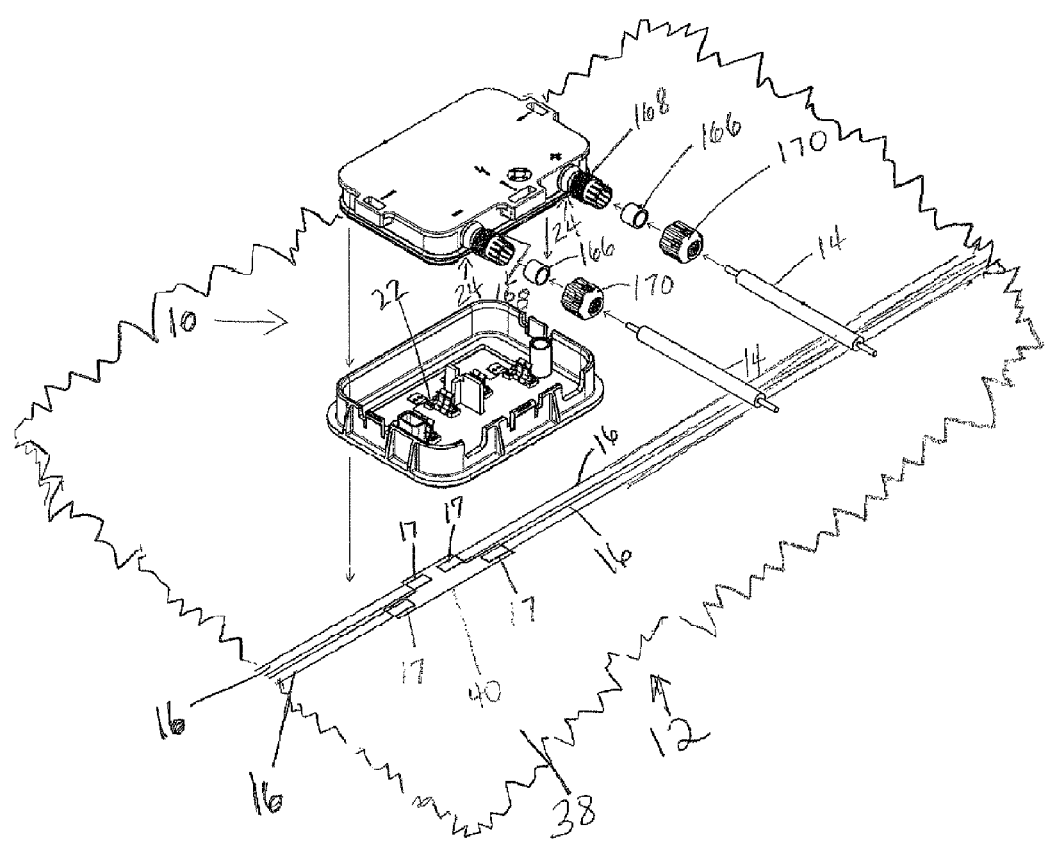
FIG. 2 is an exploded view of a junction box according to the present disclosure and a solar panel.

FIG. 1 shows one embodiment of junction box 10 secured to solar panel 12. Junction box 10 can permit wires or cables 14 to electrically connect to foil conductors 16 of solar panel 12. As shown in FIG. 2, junction box 10 can have base portion 18 for contacting foil conductors 16 via interface terminals or contacts 22 and cover 20 for connecting to contacts 22 to transmit electrical energy generated by solar panel 12 to wires or cables 14 via cable connections 24.

Figure 3:
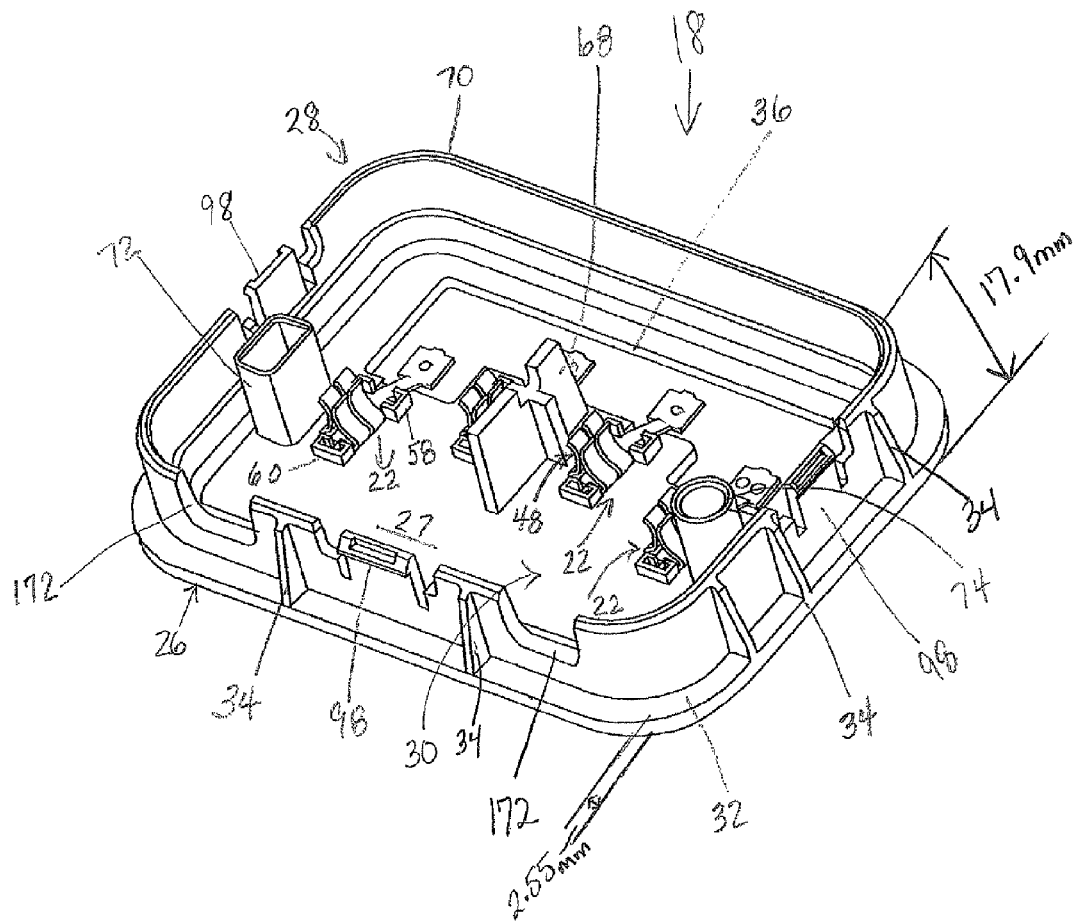
FIG. 3 is a perspective view of one embodiment of a base portion according to the present disclosure.

One embodiment of base portion 18 is shown in FIG. 3. Base portion 18 can be made from any strong stiff and durable material such as plastic, plastic alloy, metal, metal alloy, silicon, and fiberglass. It is understood that if a conductive material such as a metal or metal alloy is used an insulative or dielectric material should be place between the housing of the base portion and any electrical contacts or terminals. In one embodiment base portion 18 can be made from a dielectric material such as plastic or plastic alloy that can withstand operating temperatures of at least 200° Celsius. One example of such a plastic or plastic alloy is made by Sabic under the Noryl trademark. Base portion 18 can have base wall 26 and upstanding wall 28 extending perpendicular from inner surface 27 of base wall 26 to form a circumscribed area 30. Base wall 26 and upstanding wall 28 can take other shapes beside the rectangular shape depicted in the embodiment of base portion 18. Upstanding wall 28 can be spaced from the perimeter or edges of base wall 28 to form ledge 32. Each side of upstanding wall 28 can have support posts 34 for providing added rigidity and support to upstanding wall 28.

Base wall 26 can have cutout 36 to allow one or more contacts 22 to access exposed ends 17 of foil conductors 16 (see FIG. 2). Solar panel 12 can have a portion of the laminate 38 or a portion of the actual substrate of the panel 12 such as glass or other substrate material removed to provide an access opening 40 to expose foil conductors 16 as shown in FIG. 2. Cutout 36 can be large enough to at least allow access to all the exposed ends 17. Alternatively cutout 36 can be provided for each contact 22 to permit access to each exposed end 17. In one embodiment, contacts 22 can be the only electrical components residing in the base portion 18.

Figure 5:
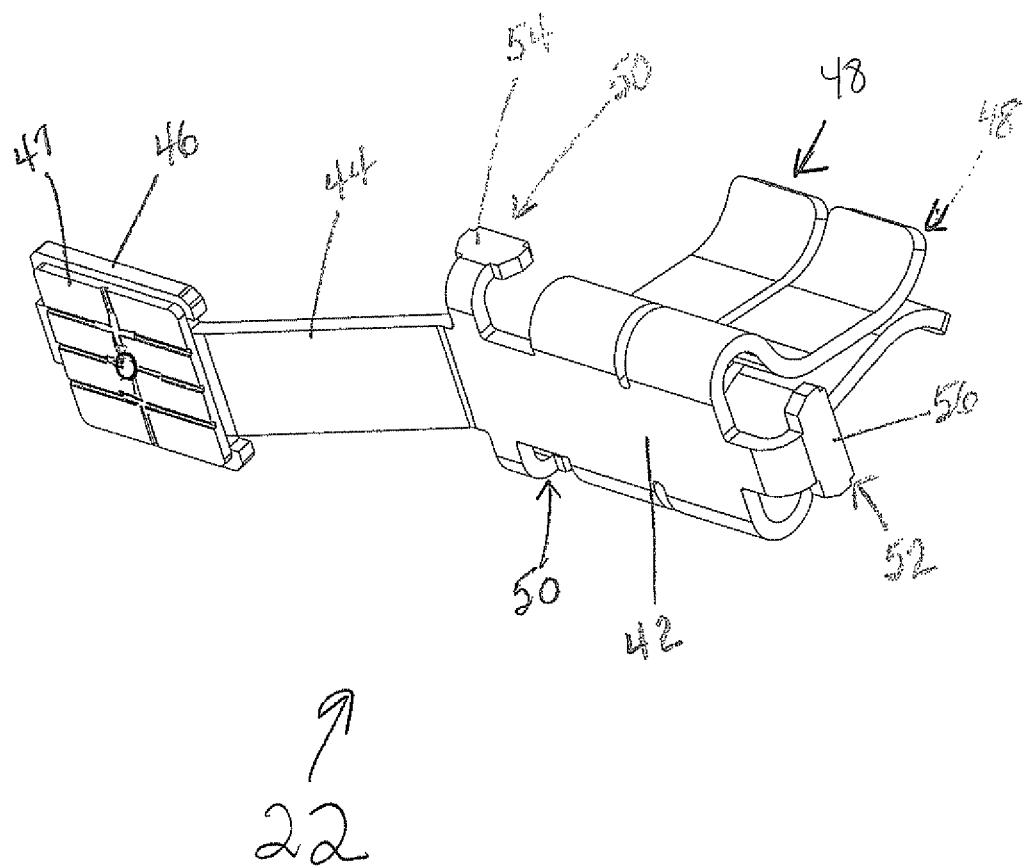
FIG. 5 is a perspective view of one embodiment of a contact according to the present disclosure.

FIG. 5 shows one embodiment of contact 22. Contact 22 can have base portion 42, spring arm 44 extending at an angle downward from base portion 42 and contact pad portion 46 at the end of spring arm 44. Extending upwards from body portion 42 can be one or more clip terminals or spring clips 48. Contact 22 also can have opposing front retaining arms 53 extending up from opposite sides of body portion 42 at an end adjacent spring arm 44 and rear retaining arm 52 extending up from rear of body portion 42. Each retainer arm 50, 52 can have platform portion 54, 56, respectively at ends thereof. Contact 22 can be made with any number of conductive materials such as metal or metal alloys. In one embodiment, contact 22 can be made from a high copper alloy. Contacts 22 may also be plated by one or more metal or metal alloys. In one embodiments, contacts 22 can be made of K65 by Wieland via know stamping processes and have nickel plating throughout. Spring clips 48 can have additional silver plating and contact pads 46 can have additional tin plating.

Contact 22 can be secured to top or inner surface 27 of base wall 26 such that contact pad portion 46 of each contact 22 is aligned in an overlaying fashion with a respective exposed end 17 when base portion 18 is secured to panel 12. Each retainer arm 52, 54 can be received in respective mounting wall 58, 60 through a friction or interference fit with the use of barbs or hooks for biting into one or more of mounting walls 58, 60. Platform portions 54, 56 cooperate with mounting walls 58, 60 to prevent side-to-side and forward and back rotation of contacts 22. Alternatively, heat staking can also be used to secure contacts 22 to base wall 26.

Figure 4:
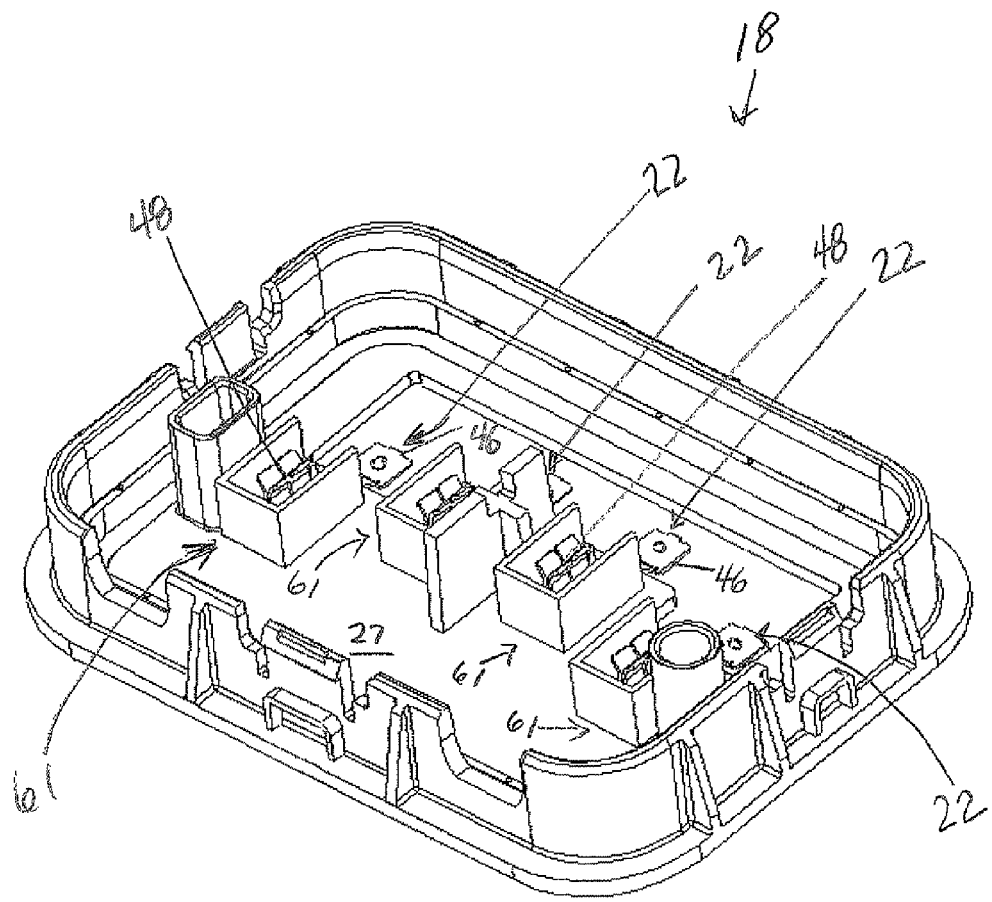
FIG. 4 is a perspective view of another embodiment of a base portion according to the present disclosure.

In one embodiment, base wall 26 can have protective walls 61 surrounding the exposed sides of spring clips 48. Protective walls 61 can extend vertically and generally perpendicular from inner surface 27 to at least the height extent of spring clips 48 as shown in FIG. 4. Protective walls 61 can extend from inner surface 27 at both lateral sides of each contact 22 and the side opposite contact pad 46 to protect against inadvertent contact with contacts 22 which could create a shock hazard after contacts 22 have been electrically connected to exposed ends 17 and/or damage contacts 22. Protective walls 61 can also inhibit arcing between contacts 22 as is discussed in detail below with respect to the terminals mounted on the cover portion 20.

Figure 6:
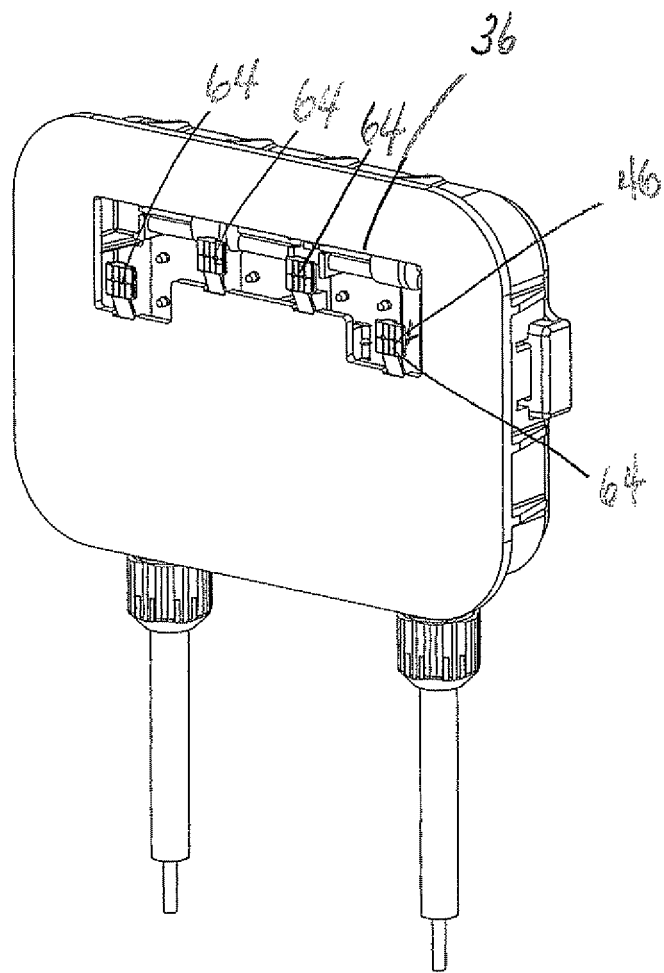
FIG. 6 is a perspective view of the underside of one embodiment of a junction box according to the present disclosure.

To secure contact between contact pad portion 46 and exposed end 17, solder charge layer 64 can be pre-applied to bottom side of contact pad portion 46 as shown in FIGS. 5 and 6. After an application of flux to exposed ends 17, heat can be applied either through automated or manual processes to melt solder charge layer 64, which upon solidification, provides a secure electrical connection between exposed ends 17 and contact pad portions 46. Alternatively, solder charge layer 64 can be omitted and solder can be applying separately during a soldering process.

As shown in FIGS. 2 and 6, contact pad portion 46 can be positioned to extend into and beyond cutout 36 to make contact with exposed end 17. Contact pad portion 46 can extend beyond the outer or underside surface 62 of base wall 26 from a fraction of a millimeter to several millimeters depending on thickness of laminate 38 or substrate removed from solar panel 12 to expose foil conductors 16 as discussed above, and to accommodate the thickness of any adhesive that may be applied to underside surface 62. Spring arm 44 resiliently biases contact pad portion 46 to remain in contact with exposed end 17 and as such can accommodate positioning contact pad portion 46 beyond underside surface 62 an added distance beyond the thickness of laminate 38 or substrate. In other words, in order to accommodate a variety of solar panel laminate 38 thicknesses, contact pads can be positioned to extend beyond underside surface 62 a distance equal to or greater than the thickest laminate 38 or substrate since spring arm 44 can accommodate movement of contact pad 46. In one embodiment, contact pads can accommodate a distance from exposed ends 17 to underside surface 62 of from about 0.5 to about 2 millimeters.

Figure 8:
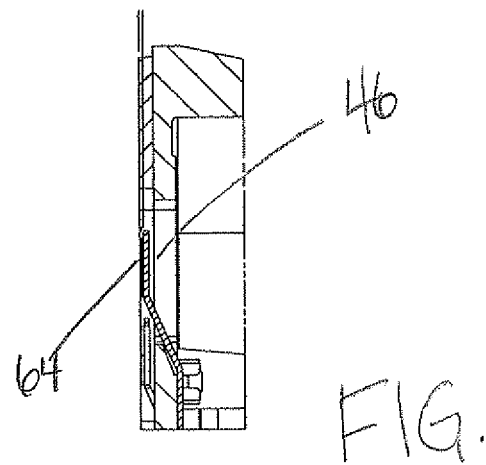
FIG. 8 is a cross-sectional view of the base portion shown in FIG. 6 taken at line 7-7.
Figure 7:
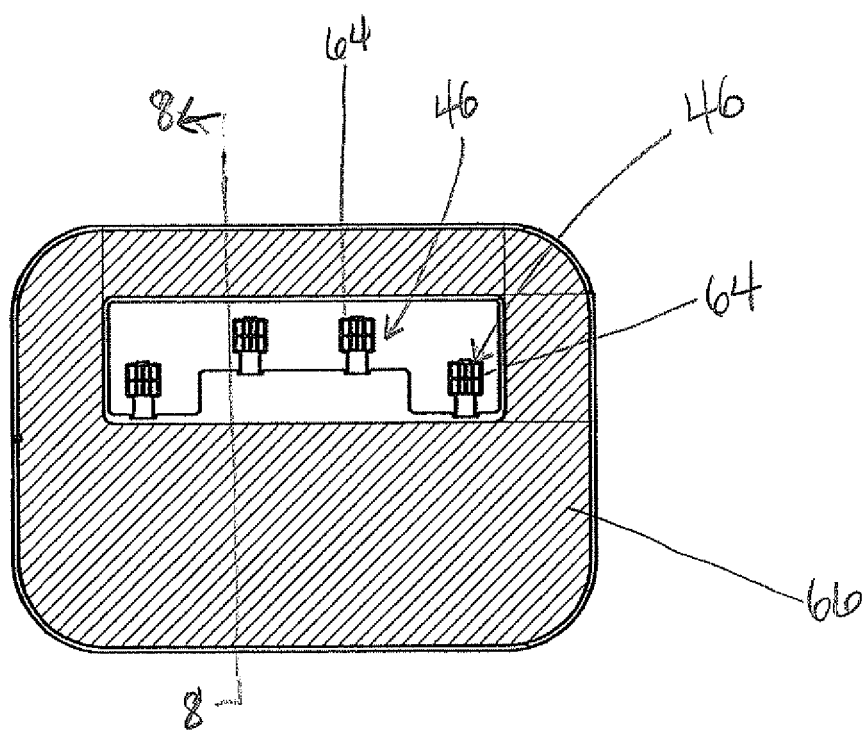
FIG. 7 is an elevation view of the underside of a base portion according to the present disclosure.

Base portion 18 can be secured to solar panel 12 by commonly known methods, for example adhesive bonding. In one embodiment, double sided tape 66 can be applied to underside surface 62 of base wall 26 as shown in FIG. 7. A protective film (not shown) can cover double sided tape 66 and cutout 36 in order to also protect contact pad portions 46. As shown in the embodiment in FIG. 8, solder charge layer 64 can be coplanar with tape 66 since tape 66 can be compressible. Alternatively, contact pad 46 and/or solder charge layer 64 can extend beyond tape 66 to accommodate laminate 38 or substrate thickness as discussed above.

To assist in urging base portion 18 against solar panel 12, base wall 26 can have bulk wall 68 extending upwards and generally perpendicularly from inner surface 27 and beyond spring clips 48. Top end of bulk wall 68 can be generally coplanar with top surface 70 of upstanding wall 28 as shown in FIG. 3. To assist in automated application of base portion 18 to solar panel 12, base portion 18 can have alignment pillars 72, 74 extending upwards and generally perpendicularly from inner surface 27 and generally coplanar with top surface 70. Alignment pillars 72, 74 can be used typically with laser, mechanical or other optical aligning processes.

Figure 9:
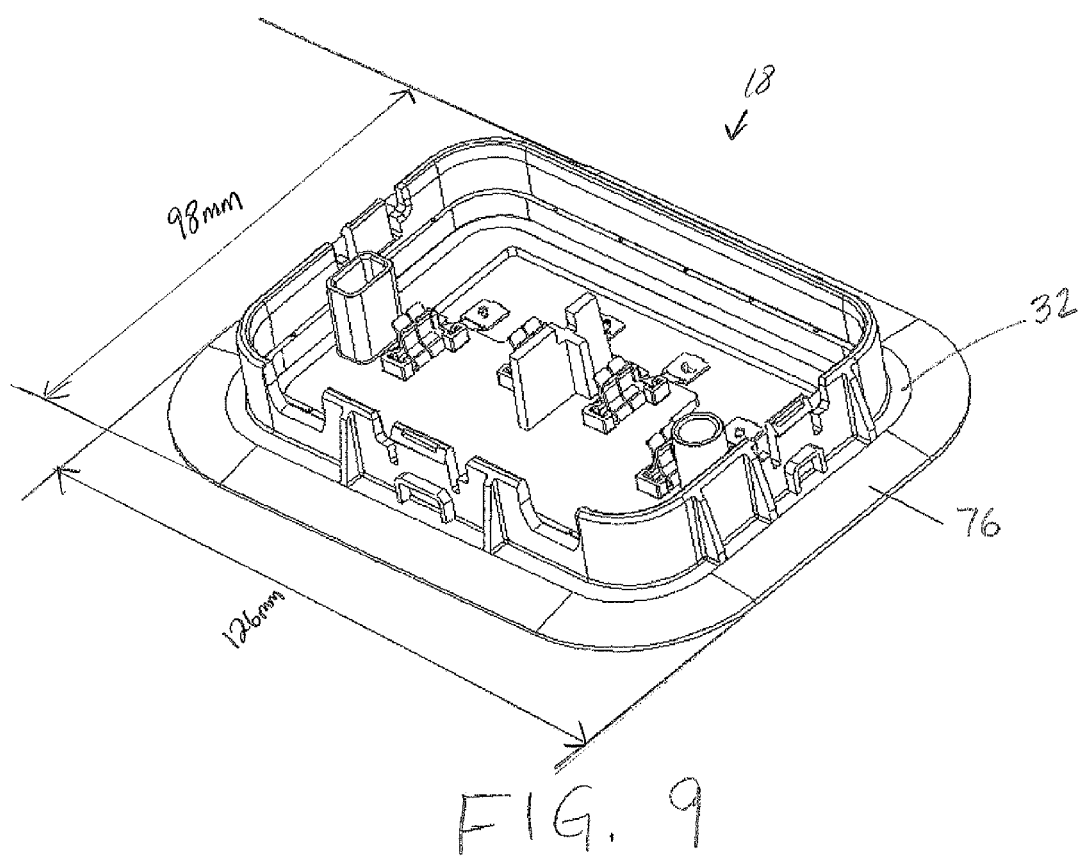
FIG. 9 is a perspective view of another embodiment of a base portion according to the present disclosure.
Figure 10:
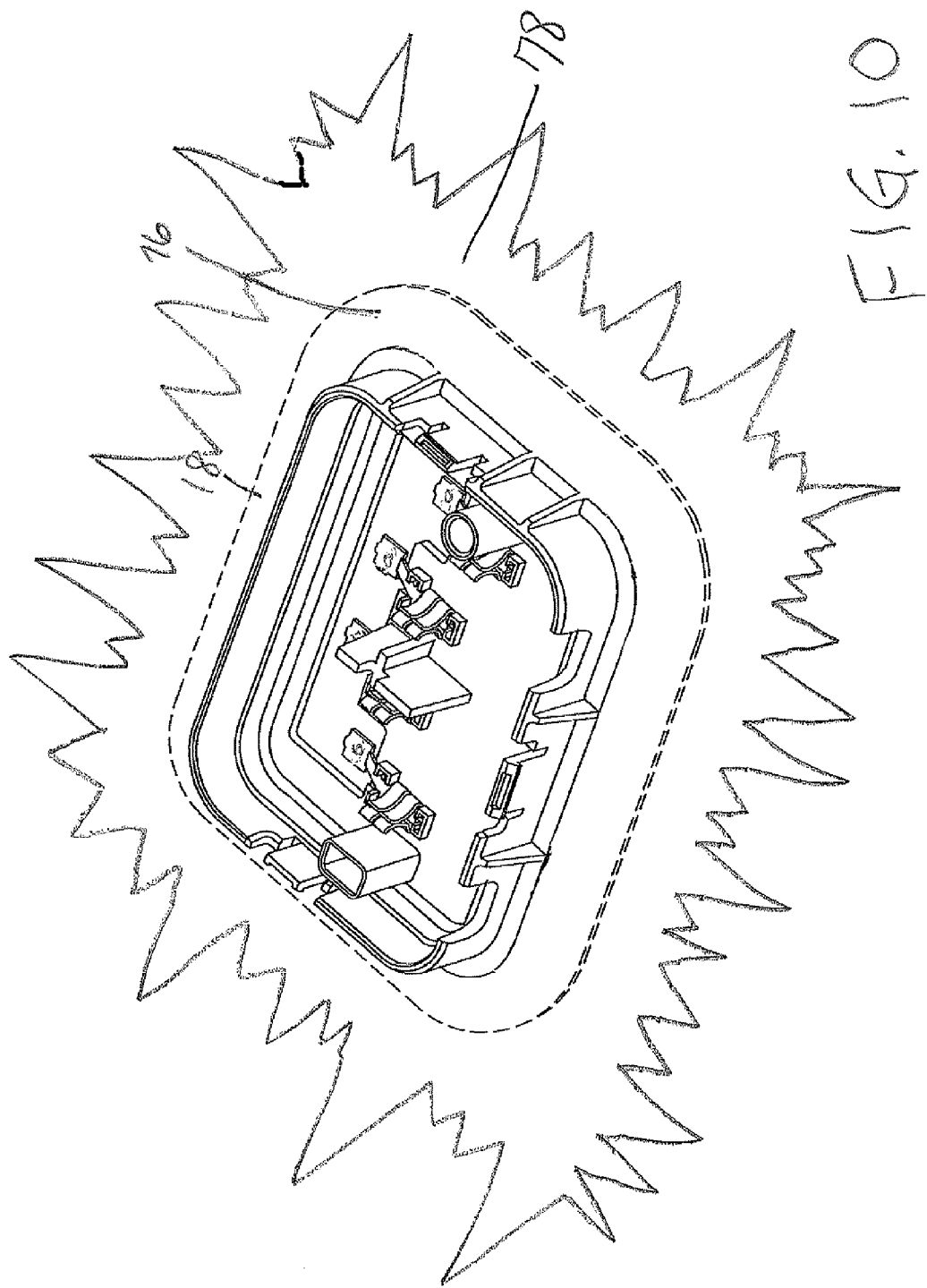
FIG. 10 is a perspective view of the base portion shown in FIG. 9 secured to a solar panel by a laminate material.

In another embodiment shown in FIG. 9, base wall 26 can extend beyond ledge 32 in a sloping manner to form skirt 76. Skirt 76 can provide additional adhesive surface area for securing base portion 18 to solar panel 12. Alternatively, as shown in FIG. 10, laminate covering 78 can cover skirt 76 to secure base portion 18 in lieu of or in addition to adhesive bonding. In one embodiment, skirt 76 can have a thickness of about 1.3 millimeters adjacent ledge 32 to about 0.6 millimeters at its terminal edge. Underside surface of skirt 76 (not shown) can be coplanar with underside surface 62 of base wall 26. In one embodiment, skirt 76 extends circumferentially beyond upstanding wall 28 a distance at least as great as the height of upstanding wall 28 measured from inner surface 27. In one embodiment shown in FIG. 3 bottom wall 26 can be about 2.55 mm thick and upstanding wall 28 can have a height of about 15.35 mm. In the embodiment shown in FIG. 9 base portion 18 can have a width and length of about 126 mm and 98 mm respectively.

Figure 11:
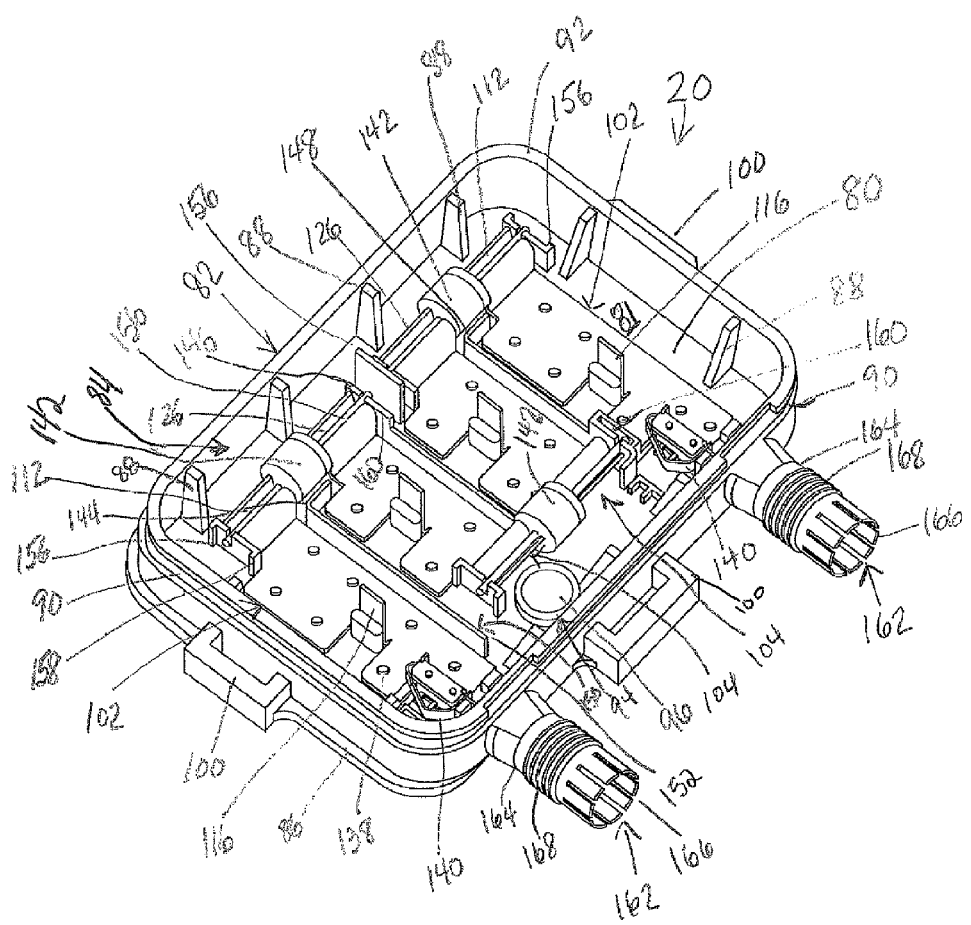
FIG. 11 is a perspective view of one embodiment of a cover portion according to the present disclosure.

FIG. 11 shows one embodiment of a cover portion 20 of junction box 10. Cover portion 20 can have top wall 80 and raised wall 82. Raised wall 82 can extend generally perpendicular from top wall 80 to form enclosed area 84. Raised wall 82 can be spaced from the perimeter or edges of top wall 80 to form lip 86. Each side of raised wall 82 can have support posts 88 for providing added rigidity and support to raised wall 82. Top wall 80 and raised wall 82 can take other shapes beside the rectangular shape depicted in the embodiment shown in FIG. 11 as long as upstanding wall 28 and raised wall 82 can nest with each other to form an enclosure. In one embodiment, raised wall 82 can be dimensioned to nest within upstanding wall 28 of base portion 18 to form a sealed enclosure. As far as the material used to form the cover portion, it is understood that the description given above with respect to the material forming the base portion 18 applies equally to cover portion 20. In one embodiment, cover portion 20 can be made of the same material as that of base portion 18.

A seal protecting the enclosure formed by the mating of base and cover portions 18, 20 can be provided on either base portion 18 or cover portion 20 since junction boxes are typically exposed to outdoor environment. In the embodiment shown in FIG. 11, cover portion 20 can include flexible seal 90 around the perimeter of raised wall 82 adjacent top surface 92. Seal 90 cooperates with upstanding wall 28 to provide a barrier against the outdoor elements such as rain and dust. Seal 90 can be made of a silicon elastomer, rubber, or rubber alloy. In one embodiment, seal 90 can be a silicon elastomer and can provide an IP 67 rating. To secure bottom and cover portion together, interacting locking members can be provided. As shown in the embodiments of FIGS. 3 and 11, bottom portion 18 can have locking tabs 98 on opposite lateral sides as well as on one of the longitudinal sides of upstanding wall 28 that engage slots 100 extending from complementary sides of raised wall 82. To ensure proper orientation of bottom and cover portions 28, 82 locking tabs 98 and slots 100 on opposite lateral sides of upstanding wall 28 and raised wall 82 can be positioned off-center along the lateral sides.

The rise and fall of temperatures can create stress on a junction box. For example, heating during daytime hours can cause air within a junction box to expand which can compromise a seal, if any, between base and cover portions. Similarly, cooling during nighttime hours can cause air inside a junction box to contract which can also compromise a seal and allow air and moisture to enter. Excessive moisture in junction box can cause the junction box to malfunction and/or fail. Allowing the pressure in a junction box to equalize without allowing moisture to enter the junction box can extend the life of the seal and the operability of the junction box.

In one embodiment, junction box 10 can have a pressure equalization hole to allow air to pass in and out of junction box 10. In the embodiment shown in FIG. 11, cover portion 20 can have pressure equalization hole 94 on top wall 80 or alternatively on raised wall 82. In order to inhibit moisture entering through pressure equalization hole a moisture barrier or absorbent may be utilized. In one embodiment, pressure equalization hole 94 can be covered with a moisture barrier film covering 96 such as for example a Gore-Tex® material.

To pass the electrical energy from bottom portion 18 to cover portion 20 of junction box 10, cover portion 20 can have one or more main component terminals for connecting to the one or more contacts 22 of bottom portion 18. Several factors can influence the number and configuration of the terminals such as the voltage carried by the terminals and the number of foil conductors and the attendant heat generated by the terminals and/or other electrical components in the junction box. As junction box 10 can be used to connect two or more solar panels together in series, the terminals can be made to accept the cumulative electrical voltage generated by the connected solar panels. The greater the voltage and/or current carried by the terminals the greater the amount of heat generated. This heat can cause failure of one or more components of the junction box 10 such as the walls of the junction box, the terminals and/or electrical components such as wire bridges or diodes. Accordingly, the terminals can be sized and arranged to enhance heat dissipation.

In the embodiment shown in FIG. 11, cover portion 20 can have four main component terminals to connect to the four contacts 22 and can handle about 1000 volts DC and can act as a heat sink to prevent the electrical components connecting the terminals together, as discussed in more detail below, from exceeding about 200° Celsius. In one embodiment, cover portion 20 can have two outer terminals 102 and two inner terminals 104. While the embodiments of outer terminals 102 shown in the drawings are identical it is not required. The same applies as to inner terminals 104.

Figure 12:
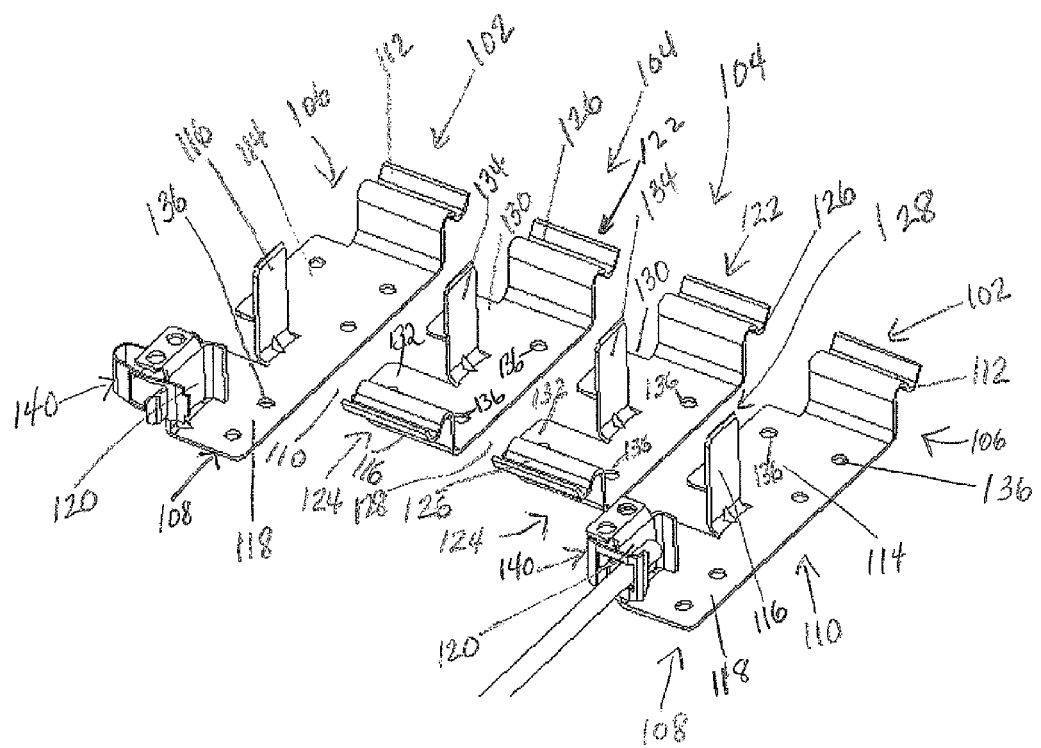
FIG. 12 is a perspective view of one embodiment of outer terminals and inner terminals according to the present disclosure.

As shown in FIGS. 11 and 12, one embodiment of each outer terminal 102 can have front end 106, opposite rear end 108 and intermediate section 110. Front end 106 can have raised retention channel 112. Intermediate section 110 can have large flat rectangular plate 114 and connecting tab 116 extending vertically and generally perpendicular to rectangular plate 114. Rear end 118 can also have a flat plate 118 and cable connection member 120 extending vertically and generally perpendicular from flat plate 118.

Inner terminals 102 can have opposing front and rear ends 122, 124. Each front and rear end 122, 124 can have raised retention channels 126. Intermediate section 128 can have front and rear flat plates 130, 132 partially separated by connecting tab 134 extending vertically and generally perpendicular to front and rear plates 130, 132.

Outer and inner terminals 102, 104 can be made of any conductive material such as metal and metal alloys. In one embodiment, outer and inner terminals 102, 104 can be made of a high conductivity, high copper alloy. Terminals 102, 104 also can be plated with one or more metal and metal alloys. In one embodiment, terminals 102, 104 can be made of high copper alloy K65 by Wieland and have nickel plating throughout. Retention channels 112, 126 and cable connection members 120 can have additional tin plating. Connecting tabs 116, 134 can have additional silver plating. Terminals 102, 104 can be formed via known stamping processes.

Each terminal 102, 104 can be secured to inner surface 81 of top wall 80. In one embodiment, terminals 102, 104 can be secured to inner surface 81 so that all the flat portions of terminals 102, 104 contact inner surface 81 to enhance heat dissipation. Terminals 102, 104 can have two or more holes 136 which mate with posts 138 extending from inner surface 81 and heat staked in place. Alternative methods to secure terminals to cover portion can be used.

Safety standards can regulate the distance terminals should be space apart from each other depending on the voltage carried as a precaution against arcing between terminals. These standards compete with the desirability of compact junction boxes. For terminals carrying 1000 volts DC but subjected to an 8000 volt DC impulse, it is recommended that terminals be spaced about ten millimeters in terms of total length along a dielectric surface. For example, while terminals may be separated by a certain distance in terms of a straight line extending between two points along a flat surface, this distance can be increased without additional spacing of the terminals by adding raised surfaces therebetween since total distance along an uneven surface is greater than similarly spaced terminals on a flat surface.

In one embodiment, cover portion 20 can have barrier walls 144, 146 and 148 extending vertically and generally perpendicular from inner surface 81 and between terminals 102, 104 as shown in FIG. 11. The height and thickness of barrier walls 144, 146, 148 can be adjusted so that the distance between adjacent terminals can meet safety standards. For example, the distance measured between outer terminal 102 and adjacent inner terminal 104 includes the distance along the height of one side 150 of barrier wall 144, the distance along the thickness 152 of barrier wall 144 and the distance along the opposite side surface 154 is greater than or at least equal to the recommended distance for the voltage carried by the terminals 102, 104. Alternatively, if the desirability of compactness is absent, terminals 102, 104 can be spaced appropriately, i.e. the recommended safety distance along a flat surface, without barrier walls or other such structures.

Figure 13:
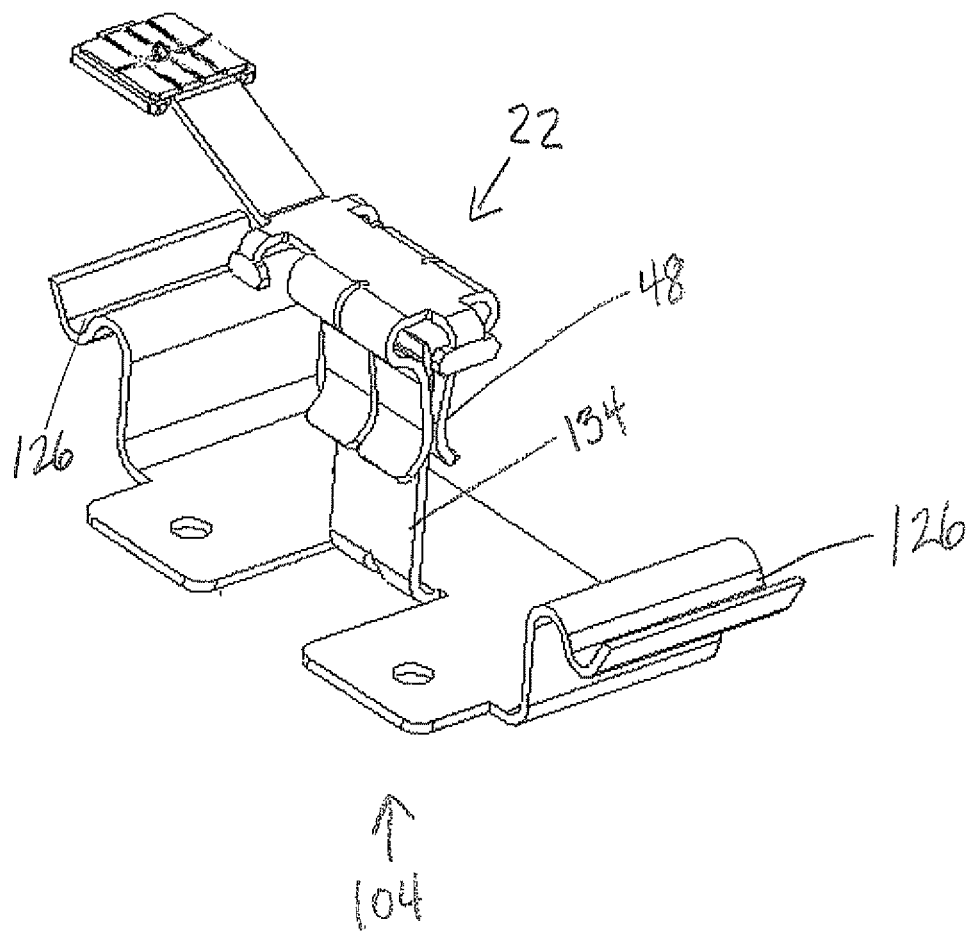
FIG. 13 a perspective view of one embodiment of a contact connected to a terminal according to the present disclosure.

Each connecting tab 116, 134 of terminals 102, 104, respectively connect to spring clips 48 of each contact 22 when base and cover portions 18, 20 are brought together to electrically connect base and cover portions 18, 20. This is shown in FIG. 13 with respect to inner terminal 104 and its respective contact 22. It is understood this also applies to the connection between other inner terminal 104 and each outer terminal 102 and their respective contacts 22.

Terminals 102, 104 can be electrically connected in series or parallel to each other by any number of electrical components. In one embodiment, front retention channel 112 of each outer terminal 102 can be axially aligned with front retention channel 126 of its respective adjacent inner terminal 104 for receiving respective ends of an electrical component to electrically connect outer terminals 102 to their respective adjacent inner terminals 104. The serial connection of terminals 102, 104 can be completed by having rear retention channels 126 of inner terminals 104 axially aligned for receiving respective ends of an electrical component to electrically connect inner terminals 104 to each other. In this manner, terminals 102, 104 can be connected in series by having outer terminal 102 electrically connected to its respective adjacent inner terminal 104 which can be electrically connected to adjacent inner terminal 104 which can be electrically connected to its respective adjacent outer terminal 102.

The particular electrical component electrically connecting terminals 102, 104 can vary depending on the voltage and current carried by terminals 102, 104. Typically for twenty four volts DC or less a simple wire bridge can be used. A wire bridge however can transmit electricity in either direction. This can allow electrical energy to flow from a power supply which the solar panels are connected to, such as a battery or electrical utility line, to flow to the solar panels. In one embodiment, diodes 142 electrically connect terminals 102, 104. Diode 142 can allow electricity to flow substantially in one direction only, thus inhibiting flow from a power supply back to the solar panels. For a junction box that can handle 1000 volts DC, diodes 142 can be selected to accept about a nine amp current. A nine amp current flow through diodes 142 can result in overheating and failure if the heat generated by diodes 142 cannot be removed or dissipated.

Figure 14:
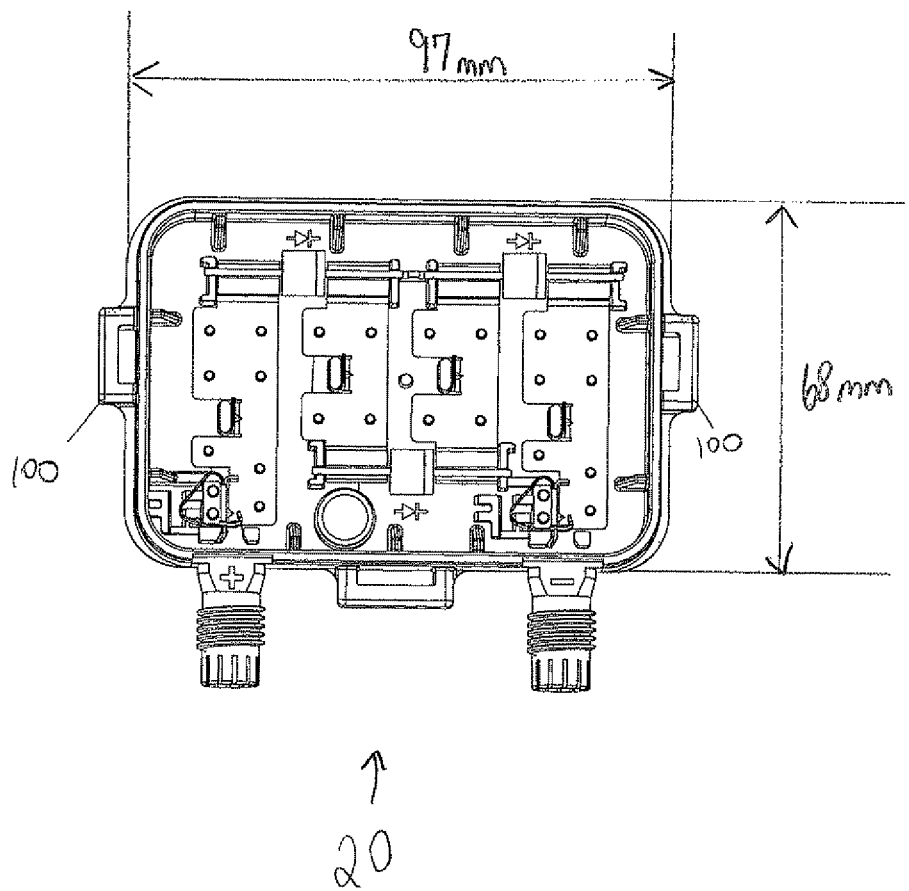
FIG. 14 is an elevation view of another embodiment of a cover portion according to the present disclosure.
Figure 15:
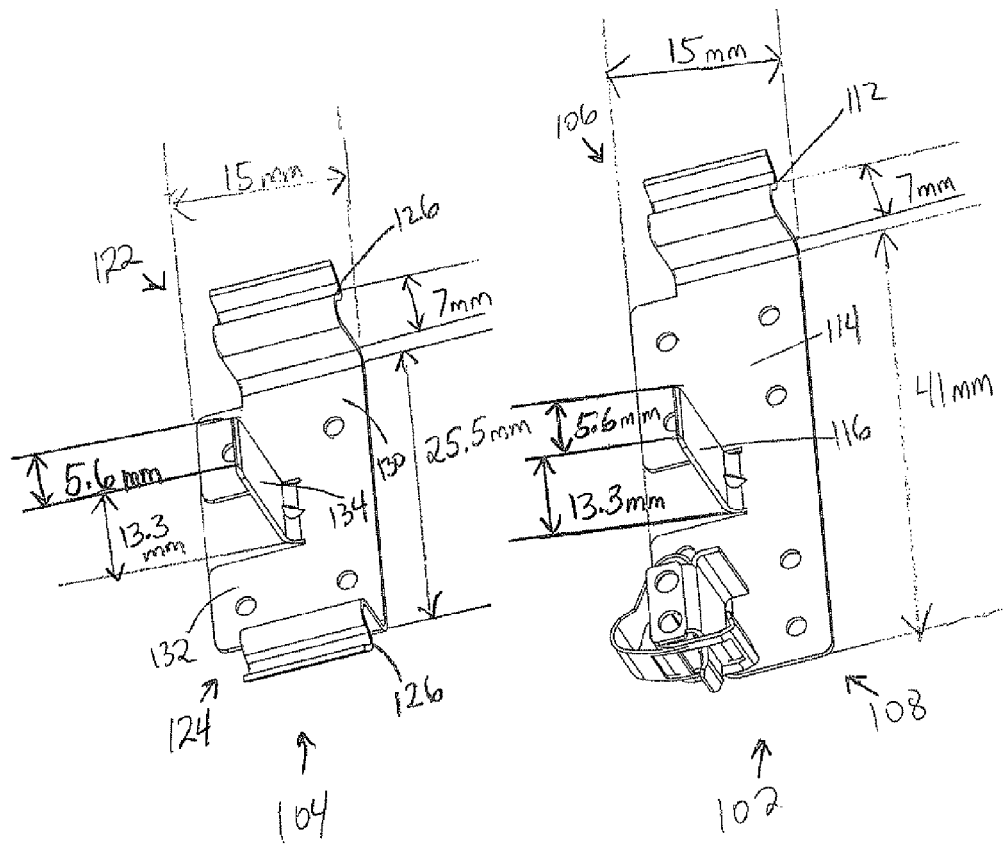
FIG. 15 is a perspective view of another embodiment of an outer terminal and an inner terminal according to the present disclosure.

The heat sink characteristics of terminals 102, 104 can dissipate the heat generated by diodes 142 in typical operating outdoor climates and prevent diodes 142 from reaching the recommended maximum temperature of about 200° Celsius. In one embodiment, the total surface area of outer and inner terminals 102, 104 in contact with inner surface 81 of cover 20 can be about 15 cm² and the total surface area of top wall 80 can be about 65 cm². Actual dimensions of these embodiments of terminals 102, 104 and top wall 80 are shown in FIGS. 14 and 15. As shown in FIG. 14, top wall 80 can have a width and length of about 97 mm and 68 mm, respectively which does not include slots 100. As shown in FIG. 15, outer terminal 102 can have a width of about 15 mm and a length of about 41 mm not including the raised portion of front end 106 which includes retention channel 112. Inner terminal 104 can have a width of about 15 mm and a length of about 25.5 mm not including the raised portion of front and rear ends 122, 124 which include retention channels 126. In both outer and inner terminals 102, 104, retention channels 112, 126 can be raised about 7 mm. Connecting tabs 116, 134 can each have a height of about 13.3 mm and a width of about 5.6.

As shown in FIG. 11, opposite leads 156 of diodes 142 can be received in raised retention channels of adjacent terminals. Raised retention channels 112, 126 can provide a press fit or interference connection with leads 156. In addition to or as an alternative to press fit connection, leads 156 can be soldered to raised retention channels 112, 126. To retain diodes 142 from movement during assembly or soldering processes, cover portion can have lead clips 156 extending from inner surface 81 or barrier walls may have lead clips 160 at an end thereof as shown with respect to barrier walls 146, 148

To transmit the electricity out of junction box 10, each outer terminal 102 can have cage clamp 140 connected to cable connection tab 120 to permit quick and easy connection of outer terminals 102 with the conductor portion of a wire or cable. To allow entry of wires or cables which connect to outer terminals 102, cover portion 20 can have access apertures 162 passing through raised wall 82 adjacent each cable connection tab 120. Extending out and about each access aperture 162 can be cable sleeve 164 having strain relief fingers 166 at terminal end thereof. As shown in FIG. 3, upstanding wall 28 of bottom portion 18 can have cable cutouts 172 for receiving cable sleeves 164.

A collar 166 can be inserted into each cable sleeves 164 to reside inside strain relief fingers 166. (See FIG. 2). Cable sleeves 164 can have threading connection 168 to accept a screw cap 170. A cable 14 having a portion of the inner conductor exposed can be inserted through collar 166 and sleeve 164. Exposed conductor can be connected to cage clamp 140 and screw cap 170 can be passed over cable 14 and tightened to sleeve 164. Strain relief fingers 166 can clamp against cable to provide support and a secure connection to cable 14.

While the present disclosure has been described in detail with reference to the foregoing embodiments, other changes and modifications may still be made without departing from the spirit or scope of the present disclosure. It is understood that the present disclosure is not to be limited by the embodiments described herein. Indeed, the true measure of the scope of the present disclosure is defined by the appended claims including the full range of equivalents given to each element of each claim.

What is claimed is:

1. A solar panel junction box comprising:
   a base portion and a cover portion for engaging said base portion to form an enclosure;
   said base portion including a generally flat bottom wall having an outer surface and an inner surface;
   said bottom wall including at least one cut-out portion;
   a plurality of solar panel interface terminals mounted to said inner surface of said bottom wall, each terminal having a resiliently biased contact end extending into said at least one cut-out portion and another end having clip terminals;
   said cover portion including a top wall having an outer surface and an inner surface;
   a plurality of main component terminals secured to said inner surface of said top wall; each of said main component terminals having a first end, a second end and a substantially flat intermediate portion contacting said inner bottom surface;
   said plurality of main component terminals including a pair of outer component terminals and a pair of inner component terminals positioned between said outer component terminals;
   a first diode connected between one of said outer component terminals and an adjacent inner component terminal;
   a second diode connected between the other of said outer component terminal and an adjacent inner component terminal;
   a third diode connected between said inner component terminals;
   each of said outer main component terminals have a cable connection end;
   each of said plurality of main component terminals having a connection tab extending from said intermediate portion of said main component terminals toward said cover portion and generally perpendicular relative to said inner surface of said bottom wall and each of said clip terminals extending toward said base portion and generally perpendicular relative to said inner surface of said top wall for connection to a respective one of said clip terminals; and
   said cover portion including a pair of cable access openings, each cable access opening positioned adjacent a respective one of said cable connection ends to facilitate electrical cable connection to said cable connection terminals.

2. The solar panel junction box of claim 1 wherein one of said base and cover portions includes a sealing gasket for sealing said enclosure.

3. The solar panel junction box of claim 1 wherein one of said cover and base portions include an opening having a moisture barrier filter therein for allowing passage of air and inhibiting passage of moisture.

4. The solar panel junction box of claim 1 wherein said first end of each outer main component terminal and said first end of each inner main component terminal include a raised portion having a retaining channel, said retaining channels of said first ends axially aligned with each other;
   said second end of each inner main component terminal includes a raised portion having a retaining channel, said retaining channels of said second ends of inner main component terminals axially aligned with each other; and
   said second end of each outer main component terminals includes said cable connection end.

5. The solar panel junction box of claim 4 wherein opposing leads of said first diode are received in said retaining channels of said first ends of one of said outer main component terminals and its adjacent inner main component terminal; opposing leads of said second diode are received in said retaining channels of said first ends of the other of said outer main component terminals and its adjacent inner main component terminal; and opposing leads of said third diode are received in said retaining channels of said second ends of said inner main component terminals.

6. The solar panel junction box of claim 5 wherein said base portion includes a peripheral wall extending generally perpendicularly from said bottom wall, and said cover portion includes a peripheral wall extending generally perpendicularly from said top wall, said peripheral walls adapted to nestingly engage each other.

7. The solar panel junction box of claim 4 wherein said base portion includes a flanged skirt portion extending from said bottom wall of said base portion and said flanged skirt portion having a lower surface generally coplanar to said outer surface of said bottom wall.

8. A solar panel junction box comprising:
a base module and a cover module;
said base module having a generally flat bottom wall with an outer bottom surface and an inner top surface;
said bottom wall including a cut-out portion;
a plurality of base terminals mounted to said inner top surface of said bottom wall, each base terminal having a solder terminal end extending into said cut-out portion and an opposite end having clip terminals extending generally perpendicular relative to said inner top surface;
said base module including an upstanding base peripheral wall adapted to nestingly mate with an upstanding cover peripheral wall;
said cover module including a generally flat top wall with an outer top surface and an inner bottom surface; said cover module including an upstanding cover peripheral wall adapted to nestingly mate with said upstanding base peripheral wall;
a plurality of main component terminals secured, in parallel orientation to each other, to said inner bottom surface; said plurality of main component terminals including a pair of outer main component terminals and a pair of inner main component terminals; each of said plurality of main component terminals having a generally rectangular configuration with a first end and a second end and an intermediate portion;
each intermediate portion comprising a generally flat rectangular terminal secured to said inner bottom surface and having a connection tab extending generally perpendicularly from said intermediate portion for connection to a respective one of said clip terminals;
said first end of each outer main component terminal and said first end of each inner main component terminal including a raised tail portion providing a plurality of axially aligned contact retaining channels;
said pair of inner main component terminals each having an raised tail portion at its second end providing a pair of axially aligned contact retaining channels;
a first diode connected between said axially aligned contact retaining channels of said first end of one of said outer main component terminals and said first end of said inner terminal adjacent thereto;
a second diode connected between said axially aligned contact retaining channels of said first end of said other outer main component terminal and said first end of said inner terminal adjacent thereto;
a third diode connected between said axially aligned contact retaining channels of said second end of said inner main component terminals;
said second end of each outer main component terminal including an up standing, cable connection terminal;
said upstanding cover module peripheral wall including a pair of cable access openings positioned adjacent said respective cable connection terminals to facilitate electrical cable connection to said cable connection terminals.

9. The solar panel junction box of claim 8 wherein each of said plurality of base terminals includes a resilient spring arm biasing said solder terminal end into said cut-out portion.

10. The solar panel junction box of claim 8 wherein said one of said base and cover modules having a sealing gasket for creating a seal between said base and cover modules and wherein one of said cover and base modules includes an opening having a moisture barrier filter therein for allowing passage of air and inhibiting passage of moisture.

11. The solar panel junction box of claim 8 wherein said base module includes a flanged skirt portion extending from said upstanding peripheral wall of said base portion a distance greater than the height of said peripheral wall of said base portion and an underside of said flanged skirt is generally coplanar to said outer bottom surface.

12. The solar panel junction box of claim 8 wherein said bottom wall includes the same number of cut-out portions as said plurality of base terminals and each of said solder terminal ends extends into a respective one of said cut-out portions.

\* \* \* \* \*